April 1, 1941. W. B. PROUTY 2,236,548
MATERIAL DISINTEGRATING AND AIR CLASSIFYING SYSTEM
Filed Nov. 6, 1937 7 Sheets-Sheet 1

William B. Prouty
INVENTOR.
BY
ATTORNEYS.

April 1, 1941.    W. B. PROUTY    2,236,548
MATERIAL DISINTEGRATING AND AIR CLASSIFYING SYSTEM
Filed Nov. 6, 1937    7 Sheets-Sheet 5

William B. Prouty
INVENTOR.
BY
ATTORNEYS.

April 1, 1941. W. B. PROUTY 2,236,548
MATERIAL DISINTEGRATING AND AIR CLASSIFYING SYSTEM
Filed Nov. 6, 1937 7 Sheets-Sheet 6

William B. Prouty
INVENTOR.
BY Gillson, Mann & Co.
ATTORNEYS.

April 1, 1941.  W. B. PROUTY  2,236,548
MATERIAL DISINTEGRATING AND AIR CLASSIFYING SYSTEM
Filed Nov. 6, 1937   7 Sheets-Sheet 7

William B. Prouty
INVENTOR.

BY *Gillson, Mann & Cox*

ATTORNEYS.

Patented Apr. 1, 1941

2,236,548

UNITED STATES PATENT OFFICE 2,236,548

MATERIAL DISINTEGRATING AND AIR CLASSIFYING SYSTEM

William B. Prouty, Evanston, Ill.

Application November 6, 1937, Serial No. 173,208

7 Claims. (Cl. 83—93)

This invention relates to material disintegrating and separating or classifying systems and has for its principal object, the provision of new and improved means for reducing various materials to finely divided particles and grading or classifying those particles.

Another object of the invention is the provision of a new and improved system of classifying ground material by air separation without the necessity of conducting any of the material through the fan or blower.

A further object of the invention is the provision of a new and improved system of disintegrating material and classifying the same by continuously grinding the material and simultaneously directing air discharged from a fan or blower through the mill and classifying apparatus without passing the ground material through the fan or blower.

A still further object of the invention is the provision of new and improved means for controlling the classification of the ground material by air separation.

Another object of the invention is the provision of new and improved separators and collectors for use in air classification of ground material.

Another object of the invention is the provision of a closed system of material grinding and air separation having novel means of control for grading the ground material.

A further object of the invention is the provision of a new and improved system of material grinding and air separation that is simple in construction, efficient in operation, accurate within narrow limits in its classification of the ground material, and that may be erected at a minimum of time and expense.

Other and further objects and advantages of the invention will appear from the following description, taken in connection with the accompanying drawings, in which—

Figure 1:
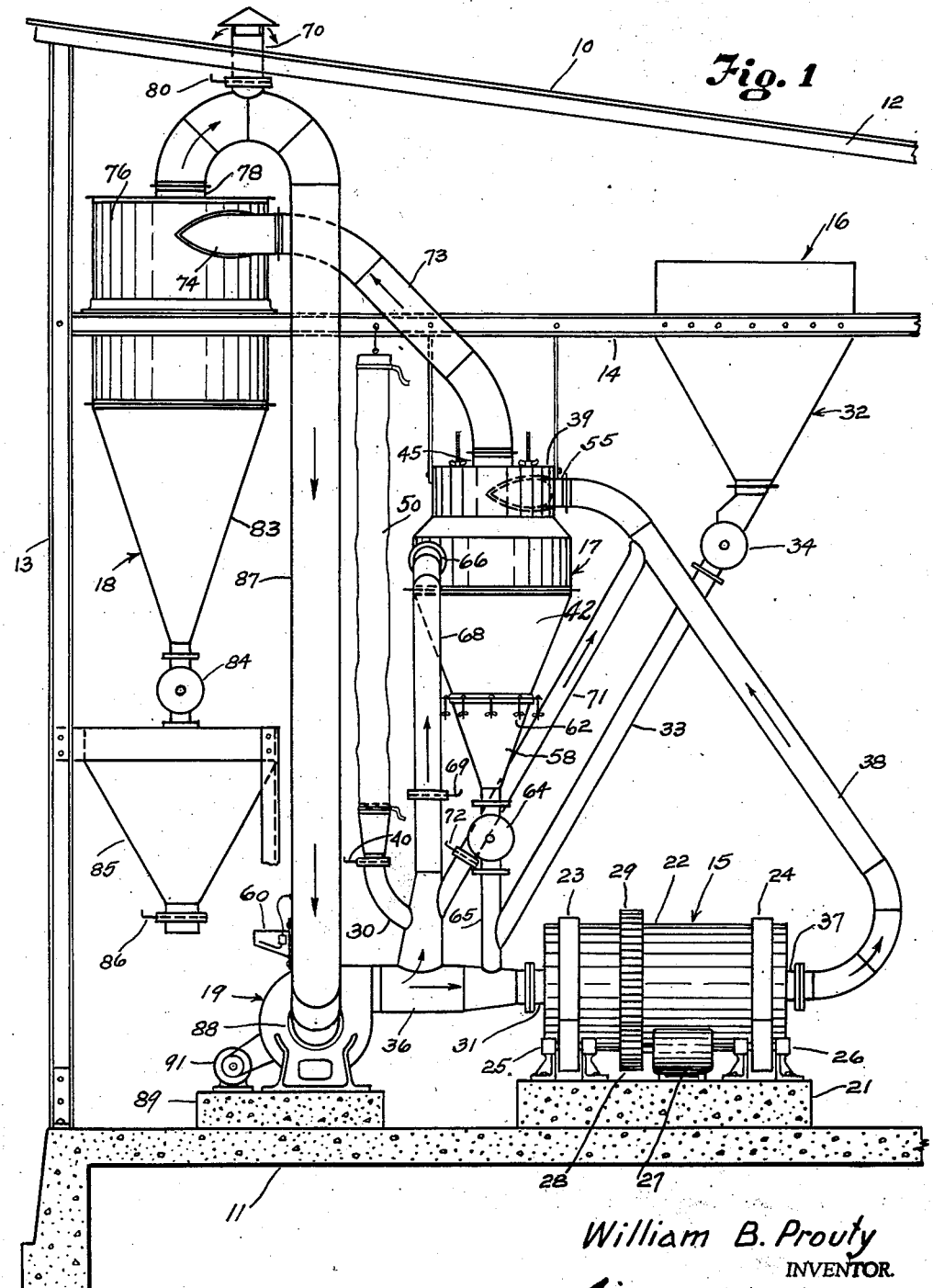
Fig. 1 is a vertical section of a building showing a material disintegrating and classifying system in side elevation and showing the system more or less diagrammatically, with parts broken away, and showing what may be termed a closed system.

In the disintegrating, classifying and collecting of material, it is common practice in the cyclone type of classifier, to so mount the fan or blower that it causes a current of air to circulate through the classifier by fan suction. Usually the fan will be inserted posterior to the classifier, such as between the classifier or separator and the collector. In the treatment of certain classes of material, such as, for instance, as material that is more or less abrasive, this arrangement is highly objectionable for the reason that this material, passing to the collector, would pass through the fan and very materially abrade the same.

The present invention seeks to avoid this difficulty by placing the fan or blower so that the same will transport the material by compressed air instead of by air suction. This may be accomplished by arranging the fan anterior of the disintegrating device and force the air through the same and through the classifier and collector whereby none of the material laden air will pass through the fan.

Referring now to the drawings, the reference character 10 designates a building having the floor or foundation 11, the roof 12, front wall 13 and supporting beam 14 spaced vertically from the floor foundation 11. The disintegrating, classifying and collecting apparatus is mounted within this building and comprises a disintegrating device or mill 15, a feed hopper 16 for supplying raw material to the disintegrating device, a separator or classifier 17 for receiving the material from the mill, a collector 18 for receiving the finer material carried over from the classifier, and a fan or blower 19 for forcing air through the system.

The disintegrating device 15 may be of any suitable construction. For the purpose of disclosure, and for example only, a conventional ball mill is employed for this purpose which is shown as being mounted on a pedestal 21, see Fig. 1. This mill comprises a rotating barrel or cylindrical container 22 having the tracks 23 and 24 extending about the end portions thereof which are adapted to rest on and be supported by the rollers or other antifriction devices 25 and 26 at each side of the cylinder. The barrel or cylinder 22 is rotated by a suitable electric motor 27 which is provided with a pinion 28 on its armature shaft and which pinion engages a ring gear 29 fixed to and extending about the barrel or cylinder 22. Since the details of the disintegration device constitute no part of the present invention, it is not thought necessary to further illustrate or describe the same any further than to state that the mill is provided with an air and material intake 31 through which air and material pass axially into the cylinder.

A hopper 32 for containing raw material is mounted on the support 14 and is provided with a discharge conduit 33 for conducting material into the passage 31. The conduit 33 is provided with a convention rotary feed valve 34 or similar means for discharging the raw material into the discharge conduit and for preventing air from blowing upward into the hopper during the operation of the apparatus, which may be operated by a separate motor as is common in such constructions. The discharge conduit 36 of the fan or blower 19 is in alignment with the conduit 31, as shown more clearly in Fig. 1 of the drawings.

The crushed material placed in the hopper 32 will pass downwardly into the conduit 31 and will be carried along with the air current from the blower or fan 19 into the mill. The material will be ground to a powder or dust of more or less fineness and this finely divided material will be swept out of the mill continuously by the current of air from the fan or blower and carried through the mill discharge conduit 37 into the elevator conduit 38 and delivered tangentially into the separator or classifier 17. The conduit 37 extends axially outwardly from the mill and is connected to the elevator conduit 38 at its outer end.

Figure 8:
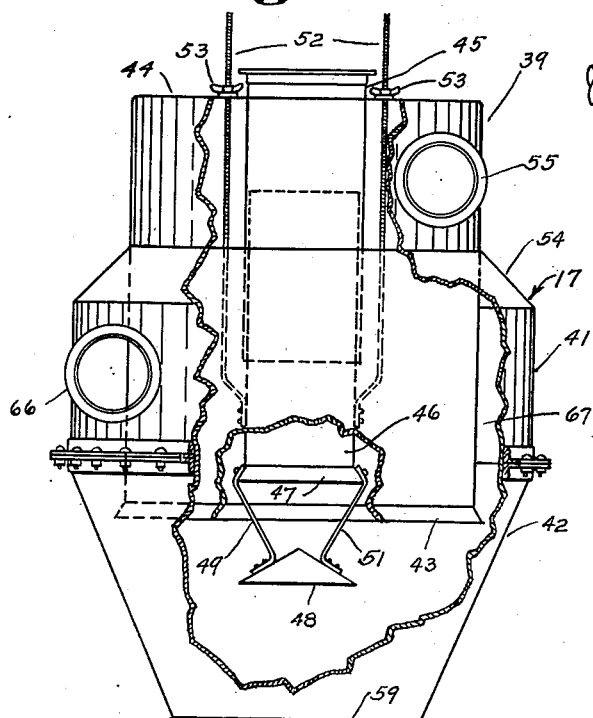
Fig. 8 is a side elevation of a separator or classifier shown in Fig. 1, with parts broken away.

The separator or classifier 17 is shown more in detail in Fig. 8 and comprises an upper cylindrical section including a cylindrical portion 39 and an enlarged tubular casing 41, a conical section 42 and a cone member 58. The cylindrical portion 39 extends downwardly through the enlarged cylindrical casing 41 and into the upper portion of the conical section 42. The lower end of the cylindrical section 39 is open and its lower edge is provided with a narrow, outwardly and downwardly extending flange 43. The upper end of the cylindrical member 39 is closed with a top member 44 which has an axial opening through which extends a tubular telescopic member 45 which is rigidly secured in said opening and extends a substantial distance down into said cylindrical member 39. The lower section 46 of the telescopic member 45 is telescoped within the tubular upper portion a substantial distance and has its lower end provided with a downwardly and outwardly extending flange 47. A cone-shaped deflector 48 is supported by means of the straps 49 and 51 a short distance beneath the flange 47. Suitable means are provided for raising and lowering the lower pipe section 46. As shown, a pair of threaded rods 52 are employed for this purpose. These rods are rigidly attached to the pipe 46 at their lower ends and extend through the top 44 and are provided with nuts 53 whereby the lower pipe section 46 may be raised and lowered.

The cylindrical casing 41 is attached at its upper end to the cylindrical member 39 by an inclined wall 54 which closes the upper portion of the annular space formed by the cylindrical member 39 and the casing 41. The upper end of the cylindrical member 39 is provided with a tangential opening about which is secured a tangential pipe fitting 55. The elevator conduit 38 is connected to the fitting 55, Fig. 1.

The dust laden air entering the separator tangentially through the intake 55 is caused to move spirally around the telescopic member 45 within the cylinder member 39 and the coarser ground material or rejects will, by centrifugal force, be thrown against the walls of the member 39 and will, by gravity, fall to the bottom of the classifier.

The cone-shaped member 42 is in the form of a truncated cone and has a secondary cone member 58 secured to its lower end. The cone-shaped member 58 constitutes, in effect, a continuation of the walls of the cone 42. The adjacent edges of these cone members are provided with annular flange fittings 59 and 61 which are adapted to be connected together by suitable bolts 62 having sleeves 63 thereon. The cone members are made in two sections so that the lower section may be removed to afford access to the interior of the separator for inspection or repairs. Making the conical section in two parts also permits a slight separation of the sections for the admission of air when the separator is employed on a system operating under suction or sub-atmospheric pressure.

The lower end of the secondary cone is provided with a rotary valve 64 through which the rejects from the separator or classifier are adapted to pass and be discharged into a conduit 65, Fig. 1, leading into the air conduit 36 and back to the mill.

The valve 64 is of the usual rotary construction and is adapted to be operated by suitable motor 60 in the usual manner. A rotary valve is provided in order to prevent air from the conduit 31, which will be under considerable pressure, from escaping into the separator through the conduit 65 leading therefrom.

The casing 41 is provided with a tangential intake or pipe fitting 66 which opens into the chamber 67, Fig. 8, surrounding the lower end of the cylindrical member 39. The enlarged cylindrical casing 41 provides an enlarged chamber within which the air entering the intake 66 circulates in a direction contra to the movement of the dust laden air entering through the opening 55 and this expansion of the air in this enlarged chamber thereby operates to reduce the velocity of the rotation of the air from the inlet 55 as it rotates about the lower end of the telescopic member 46.

A passage or conduit 68 connects the intake fitting 66, Fig. 1, with the fan discharge conduit 36 for conducting air from said conduit directly into the separator. A slide or mesh valve 69, of conventional form, is provided for controlling the amount of air passing upwardly from the fan discharge conduit 36 into the separator. These valves, as usually constructed, comprise a series of plates having circular openings of different areas therethrough, or a single plate with a series of openings of different areas, for the passage of the air so that the amount of air passing through the valve into the separator may be varied at will. In the operation of the device and with the mesh valve 69 closed practically all the solid material will be deposited in the separator, but more and more of the solid material will be carried over to the collector as the valve 69 is opened.

It will be noted that the air supplied from the fan may be delivered to the separator either by passing all of it through the mill or by passing a part of it only through the mill and the remainder directly through the conduit 68 into the separator. It also will be noted that the air passing through the elevator conduit 38 is delivered into the separator tangentially so that it will rotate about the pipe 46, Fig. 8, counter-clockwise when viewed from above, while air supplied directly from the fan through the pipe or conduit 68 will rotate in the opposite direction. By means of this arrangement, the amount of rejects separated from the dust laden air may be controlled within extremely narrow limits, or, to put it another way, by means of the valve 69, the mesh of the ground material carried over by the air from the separator to the collector may be controlled within narrow limits.

In certain classes of material, or under certain conditions and circumstances, it may be desirable that the amount of air passing through the mill be very materially reduced without reducing the amount of air introduced into the separator or classifier along with the ground material.

Suitable means are provided for shunting air around the mill. In the form of the construction shown, a shunt conduit 71 is employed for this purpose. The lower end of the conduit 71 is in communication with the blower discharge conduit 36 and its upper end is in communication with the elevator conduit 38. This conduit is also provided with a valve 72 for controlling the amount of air shunted around the mill.

A suitable conduit is provided for conducting the dust laden air from the separator or classifier to the collector 18. As shown, a conduit 73 is employed for this purpose. This conduit is attached at its lower end to the fitting 45 and at its upper end to a tangential fitting 74 in the upper portion of the collector 18.

Figure 11:
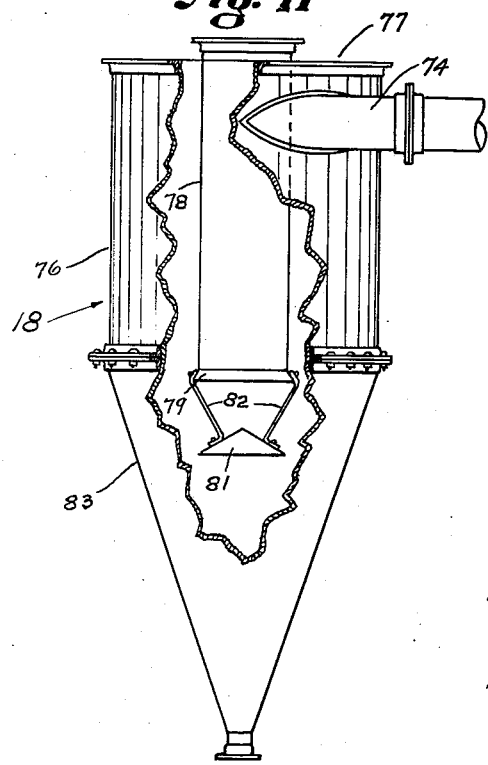
Fig. 11 is the collector shown in Figs. 1, 2 and 3, with parts broken away.
Figure 12:
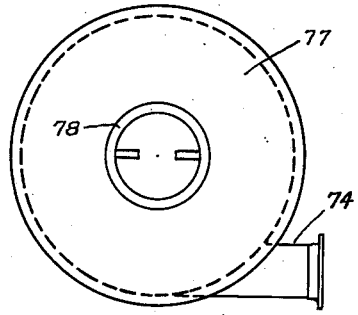
Fig. 12 is a top plan view thereof.

The collector 18 may be of the usual or any well-known construction. In the form shown, the collector comprises an upper cylindrical section 76, see Figs. 11 and 12, having its upper end closed by top member 77 having a pipe, drum or cylindrical member 78 extending axially therethrough and rigidly connected thereto. The drum or cylindrical member 78 extends slightly below the cylindrical section 76 and is provided with a downwardly and outwardly extending flange 79 which supports a conical shaped deflector member 81 below the same. The section 81 is supported by straps 82 secured to said flange 79. Attached to the lower end of the cylindrical section 76 is a cone-shaped casing 83 which extends downwardly therefrom.

The remainder of the ground material remaining in the air is separated from the air in the collector 18 and the material is delivered through a suitable rotary valve 84 at the lower end of the separator, Fig. 1. If desired, the material passing through the valve 84 may be delivered into a hopper 85 of any suitable construction. The hopper 85 may be provided with a discharge valve 86 through which the material passes or is discharged from the hopper 85. The collector 18 is of the cyclone type and the air passes out of the same axially through the pipe 78 as is usual in such constructions.

In the form of the apparatus shown in Fig. 1, the air from the collector 18 is delivered back to the intake of the fan and used over and over again. As shown, a return conduit 87 is employed for this purpose. The conduit 87 is secured to the upper end of the pipe 78 at its upper end and at its lower end is secured to the intake 88 of the fan or blower 19. This conduit is much greater in diameter than the conduit 73 whereby the velocity of the air leaving the collector will be very materially reduced so that practically all the solid material will be deposited in the collector. A discharge or breather pipe 70 leads from the conduit 87 upwardly to the exterior of the building. This pipe permits escape of air from the system to compensate for the additional air introduced into the system along with the ground material. A valve 80 may be adjusted to control the amount of air discharged through the breather or discharge pipe 70. The fan or blower 19, may, if desired, be mounted on a suitable pedestal 89 and is operated by a suitable motor 91.

Suitable means are provided for releasing the pressure of air within the system. This means may be employed to position the neutral point of the intake and discharge pressures of the fan within the conduit 87 or within the collector as desired. As shown, an auxiliary conduit 30, attached to the conduit 36 below the valve 69, is employed for this purpose. A valve 40 controls the amount of air discharged through this conduit 30. Preferably, though not necessarily, a cloth or fabric bag 50 is secured to the end of the conduit 30 and has its upper end secured to the framework of the building for supporting the bag in upright position. The bag screens all dust or ground material carried along by the air escaping into the bag. An air pressure gauge 60' of any suitable construction is provided to indicate the pressure within the conduit 87 adjacent to the fan. By means of the valve or damper 40 and the valve 80, the pressure within the conduit 87 may be varied at will to meet the different conditions of various ground materials for precipitating the same in the collector.

In the operation of the device, the material is fed from the hopper 32, through the rotary valve 34, along the passage 33, into the passage or conduit 36 and is carried along with the air into the mill 15. As the material is ground or disintegrated, the finer particles are continuously carried away by the air stream and elevated through the conduit 38 into the separator. The coarser particles are thrown by centrifugal force outwardly against the walls of the separator and are collected in the bottom part of the separator and pass through the rotary valve 64 back through the conduit 65 into the mill to be reground. The finer particles are carried over into the collector and are therein separated from the air by centrifugal action. The air passes back to the blower or fan through the return conduit 87 thus completing the cycle.

Figure 2:
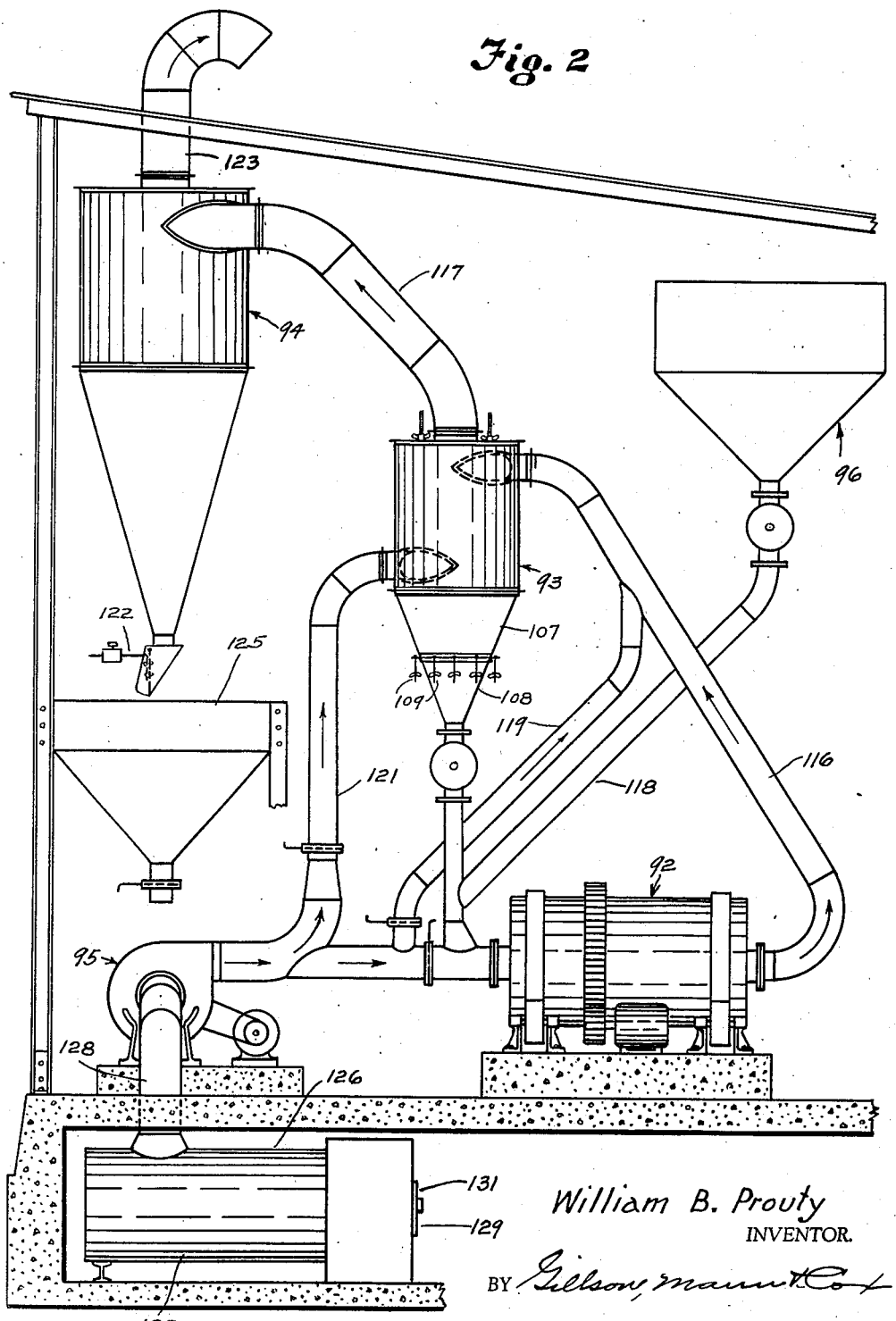
Fig. 2 is a similar view but showing a modified form of construction, the same being what may be termed an open system.

In the form of the construction shown in Fig. 2, the apparatus is similar to that just described except that the air from the collector is not delivered back to the fan to be reused. There are other differences in details in this form of the construction as will presently appear. As illustrated, the mill is shown at 92, the separator or classifier at 93, the collector at 94, the fan at 95 and the hopper for the raw material at 96.

Figure 5:
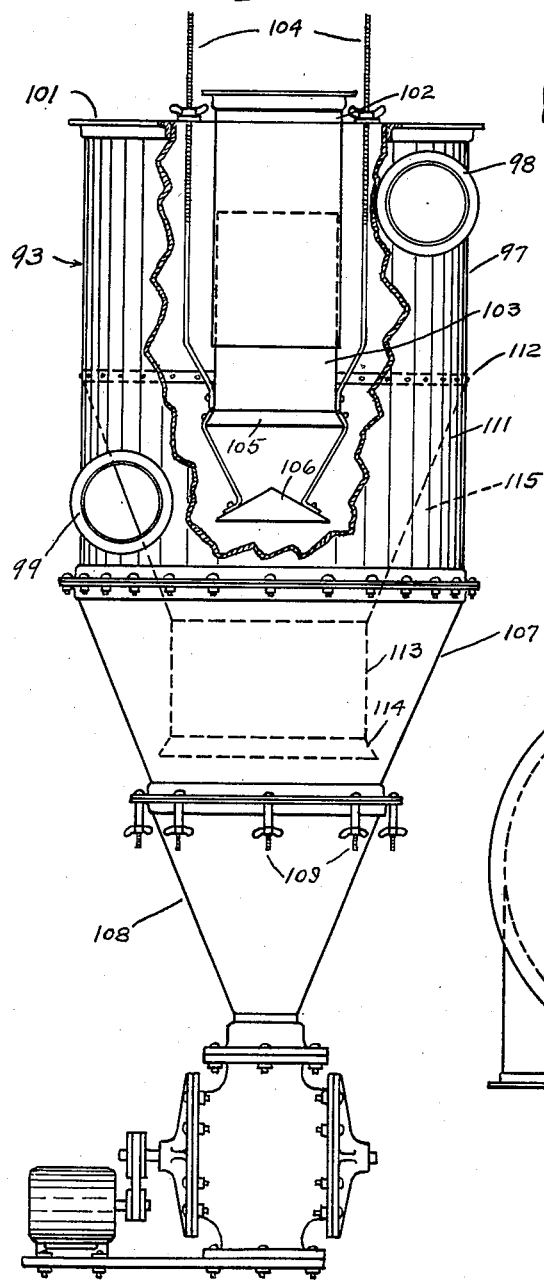
Fig. 5 is a side elevation, with parts broken away, showing the separator or classifier disclosed in Fig. 2 in detail.
Figure 7:
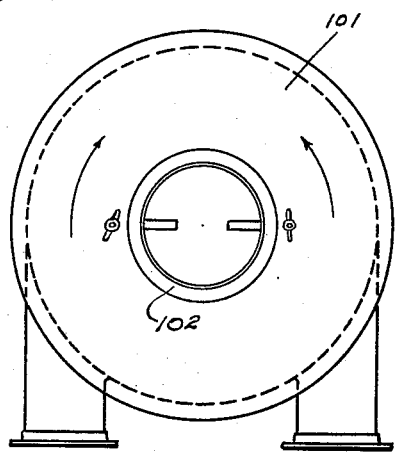
Fig. 7 is the top plan view of the classifier shown in Fig. 5.

In this form of construction, the separator 93 is different from that disclosed in Fig. 1. While a different type of separator is employed, it is understood that the form shown in Fig. 1 may also be used and that the form shown in Fig. 2 may also be used in Fig. 1. Other types of separators employing the same principle may also be used with either system. The separator 93 is shown in more or less detail in Fig. 5 and comprises a cylindrical casing or section 97 having a tangential inlet fitting 98 at its upper end and another tangential inlet fitting 99 at its lower end. The casing 97 is provided with a top wall or member 101 which closes the upper end of the casing and through the top member 101, Fig. 7, extends a drum 102 rigidly secured thereto and having a lower telescopic section 103. The part 102 is rigidly connected to the top member 101 and the section 103 is held in telescopic relation to the drum 102 by means of suitable threaded bolts 104, the lower ends of which are rigidly connected to the section 103 as shown in Fig. 5.

The lower end of the section 103 is flared outwardly as shown at 105 and a cone-shaped deflector 106 is supported beneath the section 103 as in the previously described construction.

The lower cone-shaped section 107 is attached to and supported by the upper cylindrical section 97. A secondary cone member 108 is secured to the cone member 107 by means of the bolts 109 in a manner similar to that shown in Fig. 8. Mounted within the casing 97 is a conical casing member 111, the upper end of which is rigidly secured to the casing as at 112. The lower end of the cone-shaped casing 111 terminates in a cylindrical section 113, which in turn is flared as at 114 at its lower end. The cylindrical portion 113 extends downwardly into the conical section 107 as indicated in dotted lines in Fig. 5. The inclined walls of the conical member 111 are spaced inwardly from the lower portion of the wall 97 and from the upper portion of the walls of the cone 107 whereby an annular recess 115 extending about the conical member 111 and the cylindrical member 113 is formed.

Since the elevator conduit 116, conduit 117 for conducting the dust laden air to the collector, conduit 118 for conducting the raw material from the hopper 96, the shunt conduit 119, and the conduit 121 for conducting air directly from the blower to the separator, are arranged substantially the same as the corresponding parts shown in Fig. 1, it is not thought necessary to repeat the description.

The collector, in the form of the construction shown in Fig. 2, is provided with a weighted valve 122 at its lower end instead of the rotary valve 84 in Fig. 1. The axial discharge passage 123 of the collector 94 in this construction discharges through the roof into the atmosphere instead of conducting the air back to the fan as in Fig. 1. A conventional hopper 125 is placed below the collector for receiving the ground material therefrom.

Under certain conditions, it may be desirable that the air passing through the system should be heated so that the material will be dried while it is being ground and classified. As shown, a furnace 126 is provided with the usual heating jacket 127 which is in communication with the intake 128 of the blower 95. The intake for the air 129 is provided with a suitable damper 131 for controlling the amount of air passing into the system.

Figure 3:
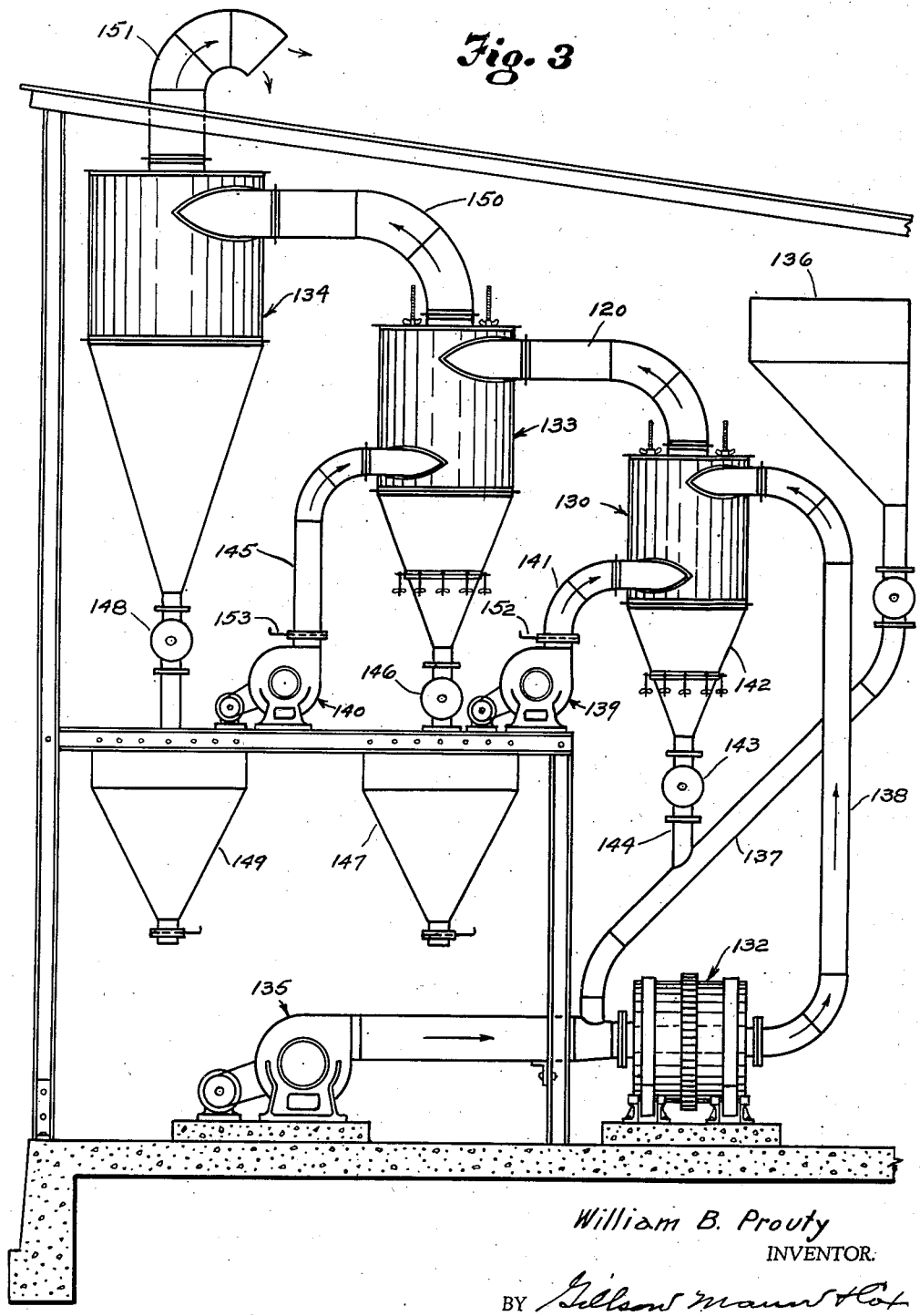
Fig. 3 is a view similar to Fig. 2 but showing a modified form of construction.

In the grinding and classifying of material, it may be desirable to make a plurality of classifications without the necessity of recirculating the ground material through the apparatus. In Fig. 3 is shown an apparatus for accomplishing this function. As shown, the apparatus comprises the disintegrating device or mill 132, a plurality of separators or classifiers 130 and 133, two being shown, a collector 134 and a blower 135. The raw material is supplied to the mill from the hopper 136 through the conduit 137 in the manner described above. The ground material passes upwardly from the mill through the elevator conduit 138 and is delivered tangentially into the separator 130 in a manner already described.

Figure 6:
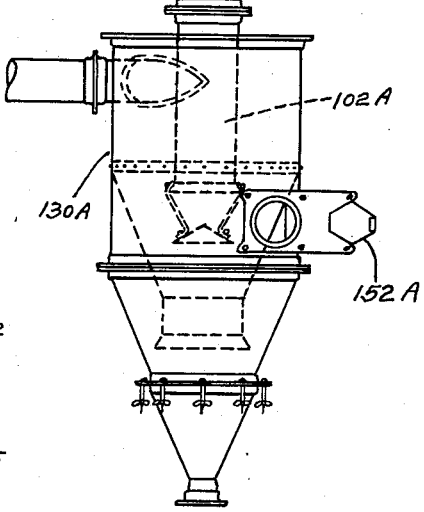
Fig. 6 is a side elevation of one of the separators or classifiers shown in Fig. 3.

Instead of supplying air from the blower 135 to the lower part of the separator in the manner above described, a separate blower 139 is used for this purpose. The blower delivers the air through a conduit 141 tangentially into the lower portion of the separator in a direction contra to that delivered through the conduit 138 and the rejects pass downwardly through the conical portion 142 of the separator 130, through a rotary valve 143 in a discharge passage 144, and into the conduit 137 of the hopper 136. Air from the separator 130 passes over into the separator 133 through the passage 120 and is delivered tangentially thereto, and in this separator, substantially the same operation takes place as in the first separator in that a second fan 140 supplies air through conduit 145 on the lower portion of the cylindrical part of the separator or classifier. The coarser mesh material passes downwardly through the separator and through the rotary valve 146 into a bin 147. The finer material is carried through the conduit 150 into the collector 134 where it is separated from the air and delivered through the rotary valve 148 into the bin 149. Air passes from the collector 134 through a discharge conduit 151. The conduits 141 and 145 from the fans or blowers 139 and 140 are provided with mesh valves 152 and 153 for controlling the amount of air supplied to the separators at this point and therefore control the mesh or size of the material precipitated in the corresponding separators or classifiers. The separators 130 and 133 may be like that shown in Fig. 5 or they may be like that shown at 130A in Fig. 6. The form shown in Fig. 6 differs from that shown in Fig. 5 in that the axial drum 102A is not telescopic as indicated in dotted lines shown in said figure. Instead of locating the valve 152 adjacent to the fan as in Fig. 3, it may be located adjacent to the separator as shown at 152A in Fig. 6.

With the system shown in Fig. 3, the material discharged by the separator 133 to bin 147 may be the finished product and the material discharged by collector 134 into bin 149 may be the by-product. By this means, the system can be used to fix both the maximum and minimum size of the material discharged to bin 147, in one operation. The dust discharged by collector 134 to bin 149 may, therefore, be by-product. Removal of fine dust from the finished material affords an advantage in the production of materials required for rapid filtration of liquids.

While only two separators are shown, it is understood additional ones may be employed if further or finer separation of the material is desired.

Figure 4:
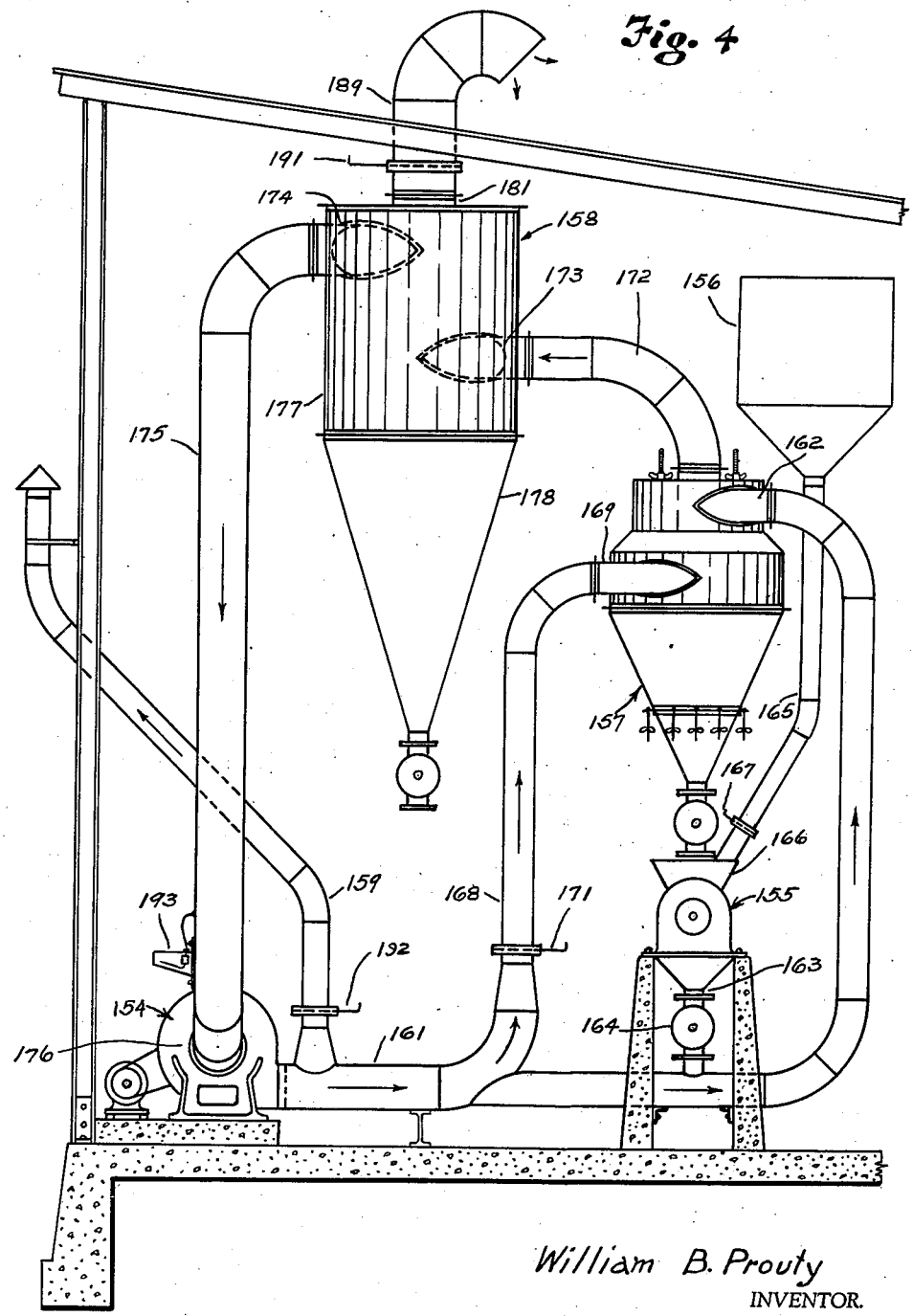
Fig. 4 is a view similar to Fig. 1 but showing a further modified form of apparatus.

In the form of the construction shown in Fig. 4, the air does not pass through the mill. This construction comprises a fan 154, a mill 155, a hopper 156, a separator 157, a collector 158, and a control mechanism 159. In this form of construction, the system is not what is termed an air swept mill. In other words, the air does not pass through the mill. The discharge conduit 161 for the fan passes beneath the mill 155 and is attached to a tangential inlet fitting 162 attached to the upper end of the separator 157. The mill is placed above the conduit 161 and a conduit 163 is adapted to conduct the material from the mill 155 into the conduit 161 through a suitable rotary valve 164. The raw material passes from the hopper or receptacle 156 through the feed conduit 165 into the mill hopper 166. A valve 167 controls the amount of material fed to the mill in any given length of time. A branch conduit 168 leads upwardly from the fan discharge 161 to the tangential fitting 169 of the separator 157. Since the separator 157 is substantially the same as the separator 17 shown in Fig. 1, it is not thought necessary to further illustrate or describe the same.

Figure 13:
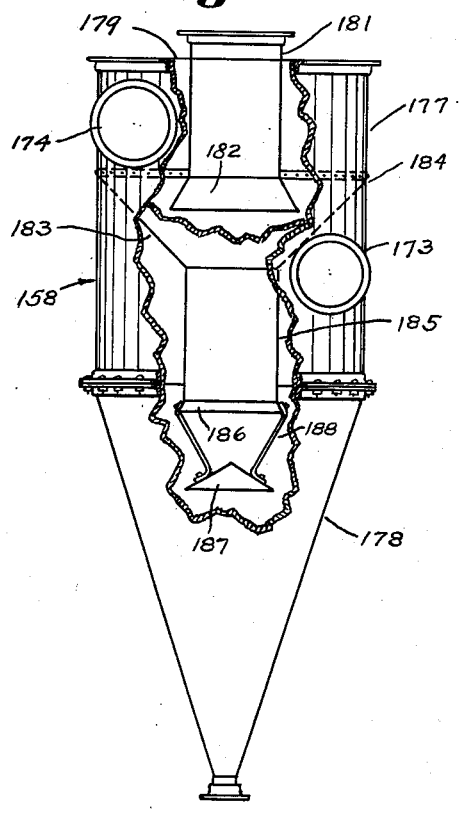
Fig. 13 is a side elevation of the collector shown in Fig. 4.
Figure 14:
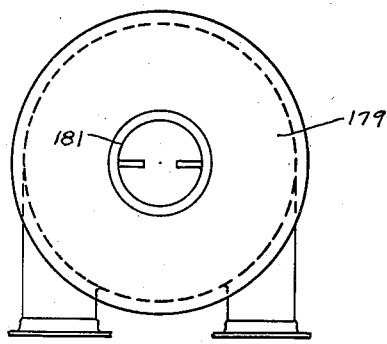
Fig. 14 is a top plan view thereof.

The conduit 168 is provided with a valve 171 for controlling the amount of air passing through the conduit 168. The separator 157 is provided with an axial discharge in communication with the conduit 172 which in turn is connected to the tangential air inlet fitting 173 of the collector 158. The collector 158 is provided with an air discharge fitting 174 to which a return pipe 175 is connected for conducting the air back to the fan. The lower end of the pipe 175 is connected to the intake 176 of the fan 154. The collector 158 is shown more in detail in Figs. 13 and 14 and comprises an upper cylindrical section 177 and a lower conical section 178. The collector is provided with an upper wall or top portion 179 which encloses the same and a drum 181 extends axially down through the top member 179 as shown in full lines in Fig. 13. The lower end of this member is flared as shown at 182. Mounted within the cylindrical section of the collector is a cone-shaped member 183 which is connected at its upper edge to the cylindrical portion at a point 184 just above the level of the flared portion 182 of the drum 181. Attached to the lower portion of the cone member 183 is a drum 185 which extends slightly below the cylindrical portion and is flared as at 186. A cone-shaped deflector member 187 is supported by hangers 188 from the flared portion 186 and is spaced downwardly therefrom. The intake tangential fitting 173 is connected to the cylindrical portion 177 at a point for delivering air below the cone diaphragm 183 and the discharge fitting 174 is attached to the upper portion of the collector above the cone-shaped member diaphragm 183 as clearly indicated in Fig. 13 of the drawings.

The collector is provided with a discharge conduit 189 connected to the drum 181. A valve 191 controls the amount of air escaping through the conduit 189.

It will be seen that the form of the construction shown in Fig. 4 is a closed system. In other words, the air from the collector, or at least a portion of the same, is delivered back to the fan and recirculated. The air on the discharge side of the fan, of course, is under more or less pressure while that on the intake side is slightly below atmospheric pressure. The neutral point is usually somewhere along the pipe 175. It is evident that if the neutral point were located within the collector, all the material suspended in the air would be more nearly precipitated due to rarefaction and reduction in velocity of the air at the neutral point. Moreover, certain types of material are lighter than others and require the use of a smaller volume of air for handling the same. It is, therefore, desirable to provide means for regulating the amount of air circulated through the system. In the form of construction selected to illustrate one embodiment of this feature of the invention, a conduit 159 leading from the fan discharge 161 is employed for this purpose. This conduit extends to the exterior of the building and is provided with a valve 192 for controlling the amount of air passing through this auxiliary discharge. By means of this valve, the amount of air circulating through the system and hence its velocity, may be controlled quite accurately and by controlling the air flowing through the remaining valves, the grading of the material may be made within extremely narrow limits. Portland cement, for instance, has been graded into six different classes.

In order to determine the pressure of the air within the conduit 175, an air pressure gauge 193 of conventional design is provided therein.

While the system, as shown, includes the mill or disintegrating device, it is understood that the system may be used without the mill. For instance, in Fig. 4, the material in the hopper 156 could be fed directly into the discharge conduit 161 of the fan or blower 154 by connecting the conduit 165 with the conduit 163 and valve 164. Then by closing the valve 171, the device could be used as an elevator or material conveyor.

Figure 9:
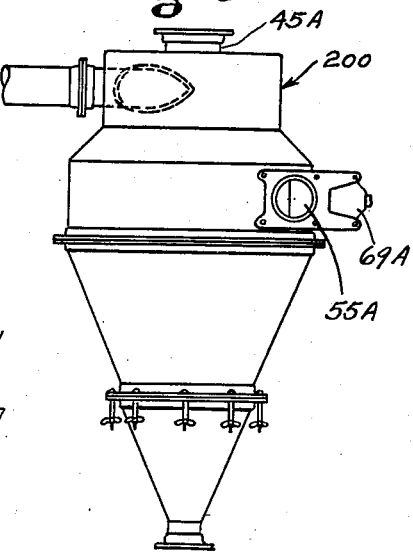
Fig. 9 is a side elevation of a slightly modified form of the device, shown in Fig. 8.
Figure 10:
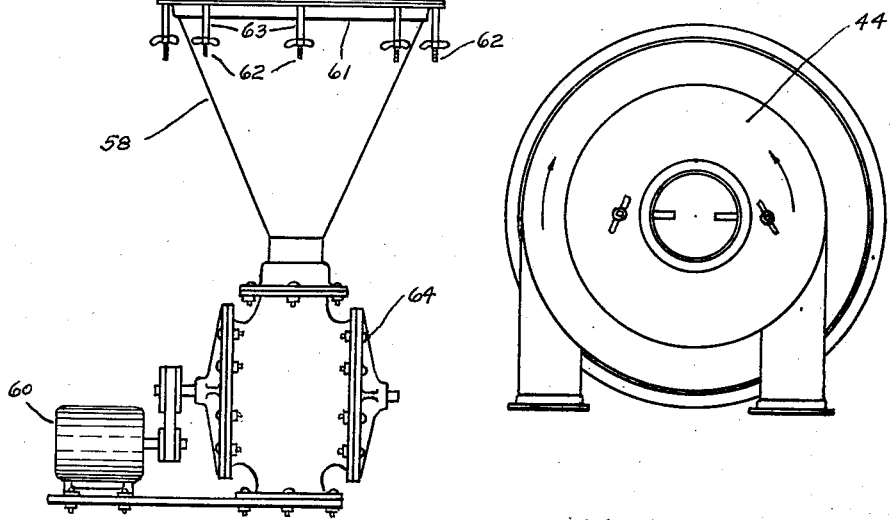
Fig. 10 is a top plan view of the construction shown in Fig. 8.

In Fig. 9 is shown a separator 200 similar to that shown in Fig. 8 but differs from it in that the fitting 55A is provided with a valve 69A instead of locating the valve in the pipe leading to the fitting as in Fig. 1. The axial tubular member 45A is not telescopic as in the construction shown in Fig. 8. Since the remainder of the structure is substantially the same as that shown in Fig. 8 except that the air flow is reversed, it is not thought necessary to further describe this form of construction.

While in all the systems shown, the mill is employed, it is evident that in the form of construction shown in Fig. 4, the material contained in the bin 156 may be already ground in which event the material passes through the mill without the necessity of its operation. Likewise, by also opening wide the mesh valve 171, the system may be made to function as a closed system, elevator or conveyor without the operation of either the mill or classifier, the mechanism between the fan and collector merely constituting a passage for the air and material.

It is thought from the foregoing taken in connection with the accompanying drawings that the construction and operation of my device will be apparent to those skilled in the art, and that changes in size, shape, proportion and details of construction may be made without departing from the spirit and scope of the appended claims.

I claim as my invention:

1. In a dust classifying and collecting system, a classifier having an upper cylindrical portion and a tapered lower portion, a fan, a discharge conduit for said fan, a passage for conducting air from said conduit and delivering the same tangentially into the upper portion of said classifier for causing the air to rotate therein in one direction, means including a disintegrating mechanism for supplying ground material to the air discharged from said fan through said passage, a shunt passage connected to said fan discharge conduit and to said first-named passage for shunting air around said mechanism, a valve for controlling the amount of air flowing through said shunt passage, an air passage for conducting air from said fan discharge passage and delivering the same tangentially into the upper portion of said classifier for causing the air therein to rotate in the opposite direction, a valve for controlling the amount of air flowing through said last-named passage, a conduit for conducting air from said fan discharge conduit to the exterior of said system, a valve for controlling the amount of air flowing through the same, a conduit for conducting air axially from said classifier and for delivering the same tangentially into the upper portion of said collector, a return conduit for returning air from said collector to the intake of said fan, a conduit opening to the exterior of said system from said return conduit, and a valve for controlling the air flowing through said last-named conduit, whereby the atmospheric pressure point of the air flowing through said collector and return conduit may be located at will therein by the manipulation of said valves, for separating the ground material from the air in said system.

2. In a dust classifying and collecting system, a classifier, a fan, a discharge conduit for said fan, a passage for conducting air from said conduit and delivering the same tangentially into the upper portion of said classifier for causing air delivered therein to rotate in one direction, means for supplying ground material to said passage, a passage for conducting air from said discharge conduit and delivering the same tangentially into said classifier for causing air therein to rotate in the opposite direction, a valve for controlling the flow of air through said last-named passage, a cyclone collector, a passage for conducting air from said classifier and delivering the same to said collector, a return conduit for conducting air from said collector to the intake of said fan, a passage in said return conduit opening to the exterior of said system, a valve for controlling the flow of air through said last-named passage, a passage for conducting air from said fan discharge conduit to the atmosphere, and a valve in said last-named passage for controlling the flow of air therethrough.

3. In a material disintegrating and air classifying system, disintegrating mechanism, a cyclone classifier, an air conduit between one side of said mechanism and classifier for delivering air tangentially into said classifier, a blower anterior of said mechanism, a discharge passage for discharging a current of air from said blower into the opposite side of said mechanism from said air conduit, means for supplying raw material to said passage, said blower causing said air to flow directly through said mechanism for causing the same to continuously transfer raw material delivered to said passage into said mechanism and for removing disintegrated material from said mechanism through said conduit and into said classifier, means for shunting a portion of the air discharged from said blower around said disintegrating mechanism, means for controlling the amount of air flowing around said mechanism, adjustable means anterior to said separator for discharging a predetermined portion of the air discharged from said blower into the atmosphere, a cyclone collector, means for conducting the air discharged from said classifier to said collector, a return conduit for conducting air from said collector to the intake of said blower, a passage opening from said return conduit into the atmosphere, and an adjustable valve in said passage whereby the atmospheric pressure point may be maintained in said collector during the operation of the system.

4. In a material disintegrating and classifying system, a disintegrating mill, a hopper for containing a supply of material for said mill, means including an air blast for conducting raw material from said hopper to said mill, a blower anterior of said mill for creating said blast, a conduit between said blower and mill, means including a cyclone separator for removing the coarser from the finer particles of the reduced material conducted from said mill, said separator having two tangential intakes in its upper portion, one in communication with said mill and the other in communication with said conduit for introducing air into said separator and for causing the same to rotate therein in opposite directions, a vent tube for discharging air from said conduit into the atmosphere, an adjustable valve therein for discharging air from said system, means including a conduit for conducting air within said system from said separator back to the intake of said blower, a passage connected to said last-named means and opening into the atmosphere, and a valve within said passage for adjustably controlling the flow of air therethrough whereby an atmospheric pressure point may be maintained at a predetermined point within said system.

5. In a system for disintegrating and classifying material, a mill, a fan, a discharge conduit for said fan connected to one end of the mill for conducting air and raw material to said mill, a cyclone separator, an elevator conduit at the opposite end of the mill opposite said discharge conduit for conducting dust-laden air from said mill and for discharging the same tangentially into said separator for causing the same to rotate in one direction within said separator, a second conduit for conducting air from said discharge conduit tangentially into said separator for causing the same to rotate in the opposite direction, means for by-passing air from said fan around said mill into said elevator conduit, means for controlling the amount of air by-passed, means for conducting air from said separator back to said fan, a vent tube having one end in communication with said discharge conduit and the other end in communication with the atmosphere, a valve for controlling the passage of air therethrough, a passage in communication with said last-named means and the atmosphere, and a valve for controlling the flow of air through said passage.

6. In a system for disintegrating and classifying material, a mill, a fan, a discharge conduit for said fan for conducting air and raw material into said mill at one end thereof, a cyclone separator, an elevator conduit for conducting dust-laden air from the opposite end of said mill and for discharging the same tangentially into the upper portion of said separator for causing the same to rotate in one direction within said separator, a second conduit for conducting air from the discharge of said fan tangentially into the upper portion of said separator for causing the same to rotate in the opposite direction, means for by-passing air from said fan around said mill, means for conducting air from said separator back to the intake of said fan, a control conduit for conducting air from the fan discharge conduit directly into the atmosphere, a fabric bag over the free end of said control conduit, an air passage opening from said means into the atmosphere, and valves in said control conduit and said air passage whereby the pressure of the air in said system may be controlled.

7. In a material disintegrating and air classifying system, a classifier, a fan, a discharge conduit for said fan, a passage for conducting air from said conduit and delivering the same tangentially into the upper portion of said classifier for causing air delivered therein to rotate in one direction, means for supplying ground material to said passage, a passage for conducting air from said discharge conduit and delivering the same tangentially into said classifier for causing air therein to rotate in the opposite direction, a valve for controlling the flow of air through said last named passage, a collector, means including conduits for conducting air from said classifier to said collector and for returning the same to the intake of said fan, a passage establishing communication between the discharge of said collector and the exterior of said system, a valve for controlling the flow of air through said last named passage, a passage for conducting air from said fan discharge conduit to the atmosphere, and a valve in said last named passage for controlling the flow of air therethrough whereby the atmospheric pressure point of the air flowing through said second named means may be located at various points along the same.

WILLIAM B. PROUTY.